United States Patent
Oldenettel

(10) Patent No.: US 8,979,076 B2
(45) Date of Patent: Mar. 17, 2015

(54) AIR SPRING DEVICE

(75) Inventor: Holger Oldenettel, Wedemark (DE)

(73) Assignee: Continental Teves AG & Co. oHG (DE)

(*) Notice: Subject to any disclaimer, the term of this patent is extended or adjusted under 35 U.S.C. 154(b) by 212 days.

(21) Appl. No.: 13/266,508

(22) PCT Filed: Feb. 15, 2010

(86) PCT No.: PCT/EP2010/051836
§ 371 (c)(1),
(2), (4) Date: Dec. 9, 2011

(87) PCT Pub. No.: WO2010/124885
PCT Pub. Date: Nov. 4, 2010

(65) Prior Publication Data
US 2012/0112392 A1    May 10, 2012

(30) Foreign Application Priority Data
Apr. 27, 2009   (DE) .................... 10 2009 003 829

(51) Int. Cl.
*F16F 9/05*   (2006.01)
*F16F 9/38*   (2006.01)

(52) U.S. Cl.
CPC .. *F16F 9/055* (2013.01); *F16F 9/38* (2013.01)
USPC .................................... 267/64.27; 267/64.24

(58) Field of Classification Search
CPC ..... F16F 9/05; B60G 15/12; B60G 2202/314; B60G 2204/1262; B60G 2500/2041
USPC ........... 267/64.19, 64.21, 64.23, 64.24, 64.27
See application file for complete search history.

(56) References Cited

U.S. PATENT DOCUMENTS

| | | | | |
|---|---|---|---|---|
| 4,200,269 A  * | 4/1980  | Ludwig | ................... | 267/64.19 |
| 6,227,527 B1   | 5/2001  | Berg | | |
| 6,511,057 B1 * | 1/2003  | Berg | ..................... | 267/64.27 |
| 7,188,827 B2 * | 3/2007  | Thomae et al. | ............ | 267/64.21 |
| 7,213,799 B2 * | 5/2007  | Behmenburg et al. | ..... | 267/64.24 |
| 8,272,627 B2 * | 9/2012  | Oldenettel et al. | ............ | 267/122 |
| 2003/0127781 A1 * | 7/2003 | Fritz | ...................... | 267/64.24 |
| 2005/0179177 A1 | 8/2005 | Thomae et al. | | |
| 2005/0253316 A1 | 11/2005 | Harms | | |
| 2009/0200718 A1 | 8/2009 | Roemer | | |

FOREIGN PATENT DOCUMENTS

| | | | | |
|---|---|---|---|---|
| DE | 1505315 A1 * | 10/1969 | ............... | F16F 9/05 |
| DE | 3934821 A1 * | 4/1991 | ............ | B60G 11/27 |
| DE | 103 23 332 | 12/2004 | | |
| DE | 10323332 A1 | 12/2004 | | |
| DE | 10 2004 007 962 | 9/2005 | | |
| DE | 102005045804 A1 | 3/2007 | | |
| DE | 102006005459 A1 | 8/2007 | | |

(Continued)

OTHER PUBLICATIONS

International Search Report issued in PCT/EP2010/051836 filed Feb. 15, 2010, mailed May 26, 2010.

*Primary Examiner* — Bradley King
*Assistant Examiner* — Stephen Bowes
(74) *Attorney, Agent, or Firm* — RatnerPrestia

(57) ABSTRACT

An air spring device having a folding bellows which protects the rolling fold against contaminants, the folding bellows being fastened to that end of the rolling piston which lies opposite the rolling fold, and surrounding the outer guide at least over the length of the latter.

9 Claims, 1 Drawing Sheet

(56) References Cited

FOREIGN PATENT DOCUMENTS

| | | | |
|---|---|---|---|
| DE | 10 2006 046 560 | 4/2008 | |
| DE | 10 2007 004 037 | 7/2008 | |
| EP | 0 944 486 | 9/1999 | |
| FR | 1482824 A | * 6/1967 | ................ F16F 9/05 |
| JP | 02037011 A | * 2/1990 | ............. B60G 11/58 |
| JP | 2007-309357 | 11/2007 | |
| JP | 2008-82468 | 4/2008 | |
| JP | 2009-63014 | 3/2009 | |
| WO | 2007124923 A1 | 11/2007 | |

\* cited by examiner

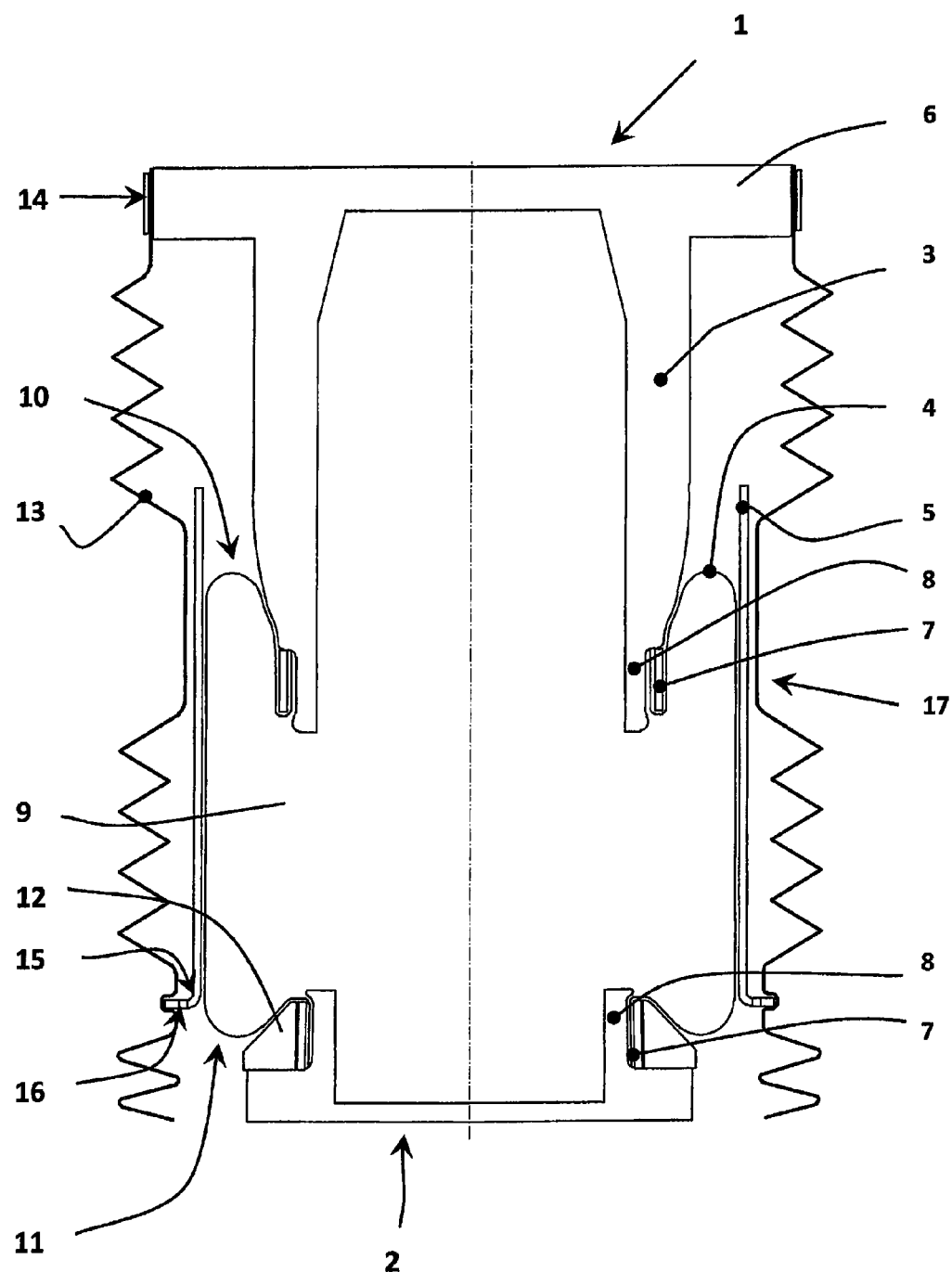

AIR SPRING DEVICE

CROSS REFERENCE TO RELATED APPLICATIONS

This application is the U.S. National Phase Application of PCT International Application No. PCT/EP2010/051836, filed Feb. 15, 2010, which claims priority to German Patent Application No. 10 2009 003829.9, filed Apr. 27, 2009, the contents of such applications being incorporated by reference herein.

FIELD OF THE INVENTION

The invention relates to an air spring device having an air spring bellows which is made from elastomeric material and is clamped in an airtight manner between an air spring cover and an air spring rolling piston, the air spring bellows rolling on the air spring piston with the formation of a rolling fold and being fastened to the air spring cover with the formation of a second fold, having an outer guide which encloses the air spring bellows in a sleeve-shaped manner and a folding bellows which protects the rolling fold against contaminants.

BACKGROUND OF THE INVENTION

Air spring devices, also called air springs for short, which are clamped between the chassis and the vehicle body and which have an air spring bellows which in turn is fastened between an air spring cover and a rolling piston are known in a multiplicity of embodiments. The air spring is at an inner excess pressure during operation. The air spring bellows rolls under load and, in the case of spring movements, with the formation of a rolling fold on the outer contour of the concentric air spring piston/rolling piston. An air spring of this type is used frequently in road or rail vehicles, in order to achieve comfortable suspension.

Here, both air springs exist, in which the air spring bellows forms a rolling fold only on one side, namely as a rule on the rolling piston, or air springs, in which the rolling bellows is clamped between the air spring cover and the rolling piston with the formation of a two-sided (rolling) fold. Air springs with a one-sided rolling fold can often be found in passenger cars, while the air springs with a two-sided rolling fold which are often larger and more supportive are installed rather in trucks and rail vehicles.

In order to achieve a sufficient load-bearing capability of the entire system in the case of relatively thin rolling bellows, the rolling bellows or the air springs or dampers can be provided with what are known as outer guides, namely with a tubular sleeve as "supporting corset" or supporting body which surrounds the rolling bellows. Thus, for example, a thin rolling bellows can be optimized to high internal pressures and therefore high load-bearing capacities with a simultaneously satisfactory harshness behavior by way of a thin lightweight metal sleeve as supporting body. Here, the outer guides are configured and arranged in such a way that the rolling bellows can roll on one side on the outer side of the rolling piston and on the other side on the inner surface of the outer guide.

When, in particular, air springs are arranged in the chassis region of vehicles, folding bellows are often used which surround the air springs partially and by way of which, for example, the rolling fold is protected which is sensitive to contaminants. Foreign bodies, such as thrown-up stones or pieces of tar from the road surface, can namely damage the rubber skin of the rolling bellows fold considerably and reduce the service life.

The use of folding bellows of this type does not entail any particular problems, as long as air springs with integrated and coaxially arranged dampers can be used in the case of relatively generous overall heights and the usual installation position is provided for the air spring, in which position namely the air spring cover is situated at the top and the rolling piston is situated at the bottom. Here, the rolling fold points "downward". A folding bellows can then be fastened easily to the lower end of the sleeve which serves as outer guide and toward the bottom to the damper. Fastening of this type to the damper permits a sufficient "working length" which does not overextend the elasticity of the folding bellows.

On account of the small amount of installation space present in modern vehicles, however, it is often necessary to install air springs without integrated dampers in the overhead position. The dampers are then installed, for example, separately next to the air springs, which of course can reduce the "overall height" of the chassis considerably. In this installation position which is also known under the designation "upside down installation", the rolling piston, situated above, is supported on the vehicle body, while the air spring cover rests below on, for example, a transverse link of an axle. In this installation position, the rolling fold is directed upward and an annular gap, that is to say an annular "pocket", is formed between the outer guide and the rolling piston, which annular gap necessarily has to be closed by a folding bellows, since otherwise foreign bodies can collect immediately in said pocket and cannot fall out again as a result of gravity. However, the fastening of the folding bellows between the outer guide and the damper, which fastening has proven itself in the customary installation position, is then out of the question on account of the low overall height, since the damper is then attached next to the air spring. A sufficient "working length" which does not overextend the elasticity of the folding bellows is therefore not available here.

SUMMARY OF THE INVENTION

The invention provides an arrangement and fastening of a folding bellows for an air spring which is installed in the overhead position, by way of which reliable protection against contamination can be achieved and which ensures a reliable function and long service life for the folding bellows as a result of the provision of a sufficient working length for said folding bellows.

According to one aspect of the invention, an air spring device has an air spring bellows which is made from elastomeric material and is clamped in an airtight manner between an air spring cover and an air spring rolling piston, the air spring bellows rolling on the air spring piston with the formation of a rolling fold and being fastened to the air spring cover with the formation of a second fold, having an outer guide which encloses the air spring bellows in a sleeve-shaped manner and a folding bellows which protects the rolling fold against contaminants, wherein the folding bellows is fastened to that end of the rolling piston which lies opposite the rolling fold, and surrounds the outer guide at least over half the length of the latter.

BRIEF DESCRIPTION OF THE DRAWING

The invention is best understood from the following detailed description when read in connection with the accompanying drawing.

The single FIGURE shows an air spring device according to aspects of the invention in the overhead position, which air spring device here has an air spring cover which is arranged at the bottom, an air spring piston which is arranged in the upper part, and an air spring bellows.

DETAILED DESCRIPTION OF THE PREFERRED EMBODIMENTS

Here, the folding bellows is fastened to that end of the rolling piston which lies opposite the rolling fold, and surrounds the outer guide at least over half the length of the latter. The working length of the folding bellows is therefore increased by the length of the outer guide to such an extent that the elasticity and function necessary for the protection against contamination is secured over the service life. Here, the arrangement and the refinement of the folding bellows also comprise such that it surrounds the outer guide at least over half the length of the latter, and embodiments of such a type, in which the folding bellows surrounds the outer guide over more than half its length, for example by ⅔ of its length or else over its entire length.

One advantageous embodiment of the fastening which is particularly simple to assemble comprises the folding bellows having a fastening which seals against contaminants at the end of the rolling piston, for example a screw or crush strap which seals reliably against the ingress of water or against the ingress of dirt.

For reliable fixing over the length of the folding bellows, a further advantageous embodiment comprises the folding bellows being fastened on one side to the end of the rolling piston and on the other side to the outer guide. In the case of a folding bellows which surrounds the outer guide over substantially its entire length, it is advantageous that the folding bellows is fastened to that end or near that end of the outer guide which faces the air spring cover.

A further advantageous embodiment comprises the folding bellows having a fastening on the outer guide, which fastening permits ventilation of the space which is surrounded by the folding bellows. Inflation or collapse of the then relatively long folding bellows can therefore be avoided reliably.

Embodiments of ventilation of this type and fastening on the outer guide which are particularly reliable and simple to produce and therefore advantageous comprise the folding bellows being fastened to an outwardly protruding collar or projection of the outer guide, and the collar or projection having ventilating holes, or the collar or projection having interruptions or recesses, what are known as "pockets", over the circumference.

A further advantageous embodiment comprises, in the region of the outer guide, the folding bellows having at least one cylindrical section without folds. A cylindrical section of this type then takes over a certain guidance of the folding bellows on the outer guide (sleeve), which prevents the ends of the outer guide running against the inner side of the folds during compression. This can namely occur, in particular, when the outer guide is also forced into lateral movements or into a lateral offset on account of the axle kinematics.

The cylindrical section of the folding bellows then advantageously has a slightly larger diameter than the outer guide, that is to say a slightly larger internal diameter than the external diameter of the outer guide.

A further advantageous embodiment comprises the folding bellows extending or being lengthened as far as the air spring cover. An inexpensive option is therefore afforded to also protect the lower region of the air spring bellows against contaminants. If complete encapsulation is desired, it is advantageous here if the folding bellows is fastened in a "dirt-tight and water-tight" manner to the air spring cover, optionally with the provision of further ventilation.

The invention is to be explained in greater detail using one exemplary embodiment. The single FIGURE shows an air spring device 1 according to aspects of the invention in the overhead position, which air spring device 1 here has an air spring cover 2 which is arranged at the bottom, an air spring piston 3 which is arranged in the upper part, and an air spring bellows 4. The air spring bellows 4 is enclosed by a sleeve-shaped outer guide 5. The air spring piston has an upper connection part 6 for attachment, for example, to a vehicle body.

The air spring bellows 4 is pressed in an air-tight manner by way of clamping rings 7 in each case on clamping seats 8 of the air spring piston 3 and the air spring piston 2, and forms the working space 9 as an elastic-volume cavity between the air spring piston 3 and the air spring cover 2, which cavity can be loaded with an excess pressure. This excess pressure ensures that the air spring bellows 4 forms a rolling fold 10 and a further fold 11. In the case of axial relative movements of the air spring piston 3 and the air spring cover 2, the rolling fold 10 rolls on the outer circumference of the air spring piston. In the case of the fold 11, rolling on the air spring cover is minimized or prevented completely by a corresponding shape of the cover. To this end, the air spring bellows 4 is supported on the cover side by a shaped ring 12, with the result that it does not roll, or does not roll too much, over the air spring cover 2. Moreover, the excess pressure in the working space 9 presses the air spring bellows 4 from the inside against the outer guide 5. As a result, the air spring bellows 4 is supported, with the result that its radial extent does not exceed dimension which is predefined by the outer guide 5 and determines the spring characteristic significantly.

The air spring is provided with a folding bellows 13 which protects the rolling fold 10 against contaminants. The folding bellows 13 is fastened to that end of the rolling piston 3 which lies opposite the rolling fold 10 by way of a crush strap 14 which seals it against contaminants, surrounds the outer guide 5 by its entire length and also goes beyond that, namely extends as far as the end of the air spring cover 2.

The folding bellows 13 is additionally fastened to the outer guide 5 via an outwardly protruding collar 15 of said outer guide 5. The collar 15 has ventilating holes 16.

In the region of the outer guide 5, the folding bellows 13 has a cylindrical section 17 without folds, which cylindrical section 17 assumes a certain guidance of the folding bellows 13 on the outer guide 5. The internal diameter of the folding bellows in the cylindrical section is slightly larger than the external diameter of the outer guide 5.

LIST OF DESIGNATIONS

Part of the Description

1 Air spring device
2 Air spring cover
3 Air spring piston
4 Air spring bellows
5 Outer guide
6 Connection part
7 Clamping ring
8 Clamping seat
9 Working space
10 Rolling fold
11 Fold
12 Shaped ring 13 Folding bellows
14 Crush strap
15 Collar
16 Ventilating hole
17 Cylindrical section

The invention claimed is:

1. An air spring device comprising:
an air spring bellows which is made from elastomeric material and is clamped in an airtight manner between an air spring cover and an air spring rolling piston, the air spring bellows rolling on the air spring piston upon forming a rolling fold and being fastened to the air spring cover upon forming a second fold, and
an outer guide which encloses the air spring bellows in a sleeve-shaped manner and a folding bellows which protects the rolling fold against contaminants,
wherein the folding bellows is fastened to an end of the rolling piston which lies opposite the rolling fold,
the outer guide has one end located proximal to the rolling piston and another end located distal from the rolling piston,
the folding bellows is fastened to the distal end of the outer guide, and
the folding bellows includes a portion extending away from the rolling piston beyond the distal end of the outer guide.

2. The air spring device as claimed in claim 1, in which the folding bellows has a fastening on the outer guide, which fastening permits ventilation of the space which is surrounded by the folding bellows.

3. The air spring device as claimed in claim 1, in which the folding bellows is fastened to an outwardly protruding collar or projection of the outer guide, and the collar or projection has ventilating holes.

4. The air spring device as claimed in claim 1, in which the folding bellows is fastened to an outwardly protruding collar or projection of the outer guide, and the collar or projection has interruptions or recesses over a circumference.

5. The air spring device as claimed in claim 1, in which the folding bellows has a fastening which seals against contaminants at the end of the rolling piston.

6. The air spring device as claimed in claim 1, in which the folding bellows has at least one cylindrical section having a slightly larger diameter than the outer guide.

7. The air spring device as claimed in claim 1, in which the folding bellows extends as far as an end of the air spring cover.

8. The air spring device as claimed in claim 1, in which the folding bellows is fastened to the air spring cover.

9. The air spring device as claimed in claim 1, in which the folding bellows has at least one cylindrical section that is unaffixed to the outer guide.

\* \* \* \* \*